US008457126B2

(12) United States Patent  
Breslin et al.

(10) Patent No.: US 8,457,126 B2
(45) Date of Patent: Jun. 4, 2013

(54) SYSTEM, METHOD AND APPARATUS FOR DISTRIBUTING CAPTURED DATA PACKETS INCLUDING TUNNELING IDENTIFIERS

(75) Inventors: Terence M. Breslin, San Mateo, CA (US); David Kucharczyk, Santa Fe, NM (US); Jan Allen Hinshaw, Prescott Valley, AZ (US)

(73) Assignee: VSS Monitoring, Inc., San Mateo, CA (US)

( * ) Notice: Subject to any disclaimer, the term of this patent is extended or adjusted under 35 U.S.C. 154(b) by 327 days.

(21) Appl. No.: 12/904,514

(22) Filed: Oct. 14, 2010

(65) Prior Publication Data
US 2011/0116510 A1    May 19, 2011

Related U.S. Application Data

(60) Provisional application No. 61/251,678, filed on Oct. 14, 2009.

(51) Int. Cl.
*H04L 12/29* (2006.01)

(52) U.S. Cl.
USPC ......................................................... 370/390

(58) Field of Classification Search
USPC . 370/229–235, 351, 389–392, 395.5–395.52, 370/400–401, 465–476
See application file for complete search history.

(56) References Cited

U.S. PATENT DOCUMENTS

| 7,340,744 | B2* | 3/2008 | Chandwadkar et al. ...... 718/105 |
| 7,421,506 | B2* | 9/2008 | Ni et al. ......................... 709/230 |
| 7,855,982 | B2* | 12/2010 | Ramankutty et al. ......... 370/259 |

OTHER PUBLICATIONS

Zhang et al, Traffic Trace Artifacts due to Monitoring via Port Mirroring, IEEE, 8 pages, 2007.*

* cited by examiner

*Primary Examiner* — Frank Duong
(74) *Attorney, Agent, or Firm* — Edwards Wildman Palmer LLP; Scott D. Wofsy; Christopher J. Capelli

(57) ABSTRACT

A network traffic distribution device (e.g., a network tap or similar device) is configured to receive and analyze captured network traffic data packets that include tunneling IDs (e.g., GTP tunneling IDs) and, based on that analysis, to distribute those data packets in such a way that data packets with the same tunneling IDs are distributed to a common egress port of the network traffic distribution device. In some cases, each flow of data packets with a common tunneling ID is sent to a unique external device, while in other cases, two or more traffic flows, each with packets having respective, common tunneling IDs may be provided to the same external device, either via a common egress port of the network traffic monitoring device or via separate egress ports thereof.

14 Claims, 3 Drawing Sheets

| Header | Tunneling ID | Payload | FCS/ CRC |
|---|---|---|---|
| 205 | 210 | 215 | 220 |

SYSTEM, METHOD AND APPARATUS FOR DISTRIBUTING CAPTURED DATA PACKETS INCLUDING TUNNELING IDENTIFIERS

RELATED APPLICATIONS

This application is a NONPROVISIONAL of, claims priority to and incorporates by reference U.S. Provisional Patent Application 61/251678, filed 14 Oct. 2009.

FIELD OF THE INVENTION

The present invention relates to a network captured traffic distribution device and, in particular, such a device as is configured for distributing captured data packets that include tunneling identifiers.

BACKGROUND

In order to facilitate communication of data packets through complex communication networks, infrastructure equipment supporting the communication network frequently insert information into data packets flowing through the communication network in order to assist in the routing and/or tracking of the data packets as are they are transmitted through the communication network. Further, data communication networks, such as general packet radio service (GPRS) networks, which are used by the global system for mobile communication (GSM), typically employ tunneling protocols to enable the transfer of data packets from an entry point, throughout the data communication network, to a target destination. Typically, a unique tunneling identifier (ID) is assigned for each individual data session or user conversation transmitted over the data communication network.

The usual protocol for tunneling IDs for GSM network is the GPRS tunneling protocol (GTP). When using the GTP protocol, tunneling identification data (TID) is pushed into to a data packet communicated through the GSM network. However, it is usually the case that only the infrastructure equipment responsible for transmitting the data packets through the communication network understands the information added to data packets. Interception or capture of these data packets for network communication monitoring or analysis purposes can therefore be problematic, as the monitoring and analyzing devices have difficulty understanding the additional information inserted into the data packet by the computer networking infrastructure. This confusion leads to inefficiency, latency, and decreased throughput in the processing of data packets by network monitoring and analysis equipment. Further, when load balancing or other commonly used distribution methods are applied to packets that are sent to multiple monitoring devices, and these packets are encapsulated inside a tunnel or other formatting is applied that is not native to the monitoring distribution device, packets from the same tunnel may be spread across differing output ports. This distribution causes analysis tools or other connected devices to miss packets, see fragments or otherwise receive incomplete/corrupted streams.

SUMMARY OF THE INVENTION

A network traffic distribution device (e.g., a network tap or similar device) is configured to receive and analyze captured network traffic data packets that include tunneling IDs (e.g., GTP tunneling IDs) and, based on that analysis, to distribute those data packets in such a way that data packets with the same tunneling IDs are distributed to a common egress port of the network traffic distribution device. In some cases, each flow of data packets with a common tunneling ID is sent to a unique external device, while in other cases, two or more traffic flows, each with packets having respective, common tunneling IDs may be provided to the same external device, either via a common egress port of the network traffic monitoring device or via separate egress ports thereof.

In one embodiment of the present invention, a network traffic distribution device that includes a plurality of ingress and egress ports receives (at one or more of the ingress ports) a plurality of captured data packets, determines a respective tunneling ID associated with each respective data packet, and distributes the data packets across the plurality of egress ports such that data packets with a common tunneling ID are distributed to the same one of the egress ports. It may be the case that a single egress port is used for different flows of data packets associated with different tunneling IDs, or each respective egress port may be uniquely associated with only one flow of data packets identified by having a common tunneling ID. In some instances, the tunneling ID is a GTP tunneling ID. The data packets may be telecommunications data packets.

In further embodiments of the present invention, a system that includes a plurality of network communication nodes for transmitting flows of data packets also includes a network traffic distribution device communicatively coupled to either or both of a traffic capture point located on a communication link located between two or more of the nodes, and one or more mirroring ports resident on one or more of the nodes. The network traffic distribution device is configured to receive one or more of the flows of data packets and distribute those flows of data packets to external devices communicatively coupled to one or more egress ports of the network traffic distribution device such that data packets with the with the same tunneling ID are provided to the same egress port of the network traffic distribution device.

Another embodiment of the present invention provides a network traffic distribution device having a plurality of ingress ports for receiving traffic flows of captured network traffic data packets and a plurality of egress ports; a processor; and a memory for storing one or more sets of instructions to be executed by a processor, said instructions for causing the processor to analyze the captured data packets to determine a tunneling ID included in each data packet and to distribute the data packets across the egress ports so that data packets with the same tunneling ID are distributed to the same egress port.

These and further embodiments of the present invention are described in detail below.

BRIEF DESCRIPTION OF THE DRAWINGS

The present application is illustrated by way of example, and not limitation, in the figures of the accompanying drawings, in which.

DETAILED DESCRIPTION

Described herein are methods, systems and apparatus for distributing captured data packets that include tunneling identifiers. In one embodiment of the invention, a network traffic distribution device (e.g., a network tap or similar device) is configured to receive and analyze captured network traffic data packets that include tunneling IDs (e.g., GTP tunneling IDs) and, based on that analysis, to distribute those data packets in such a way that data packets with common tunneling IDs are distributed to the same egress port of the network traffic distribution device. The analysis and distribution may be performed by, or under the direction of, a processor that executes instructions for performing these activities. The instructions may be stored in a computer readable storage medium (e.g., a read-only memory (ROM), erasable programmable read only memory (EPROM), electrically erasable programmable read only memory (EEPROM), random access memory (RAM), flash memory, or other form of storage device) communicatively coupled to the processor.

Figures 1, 2:
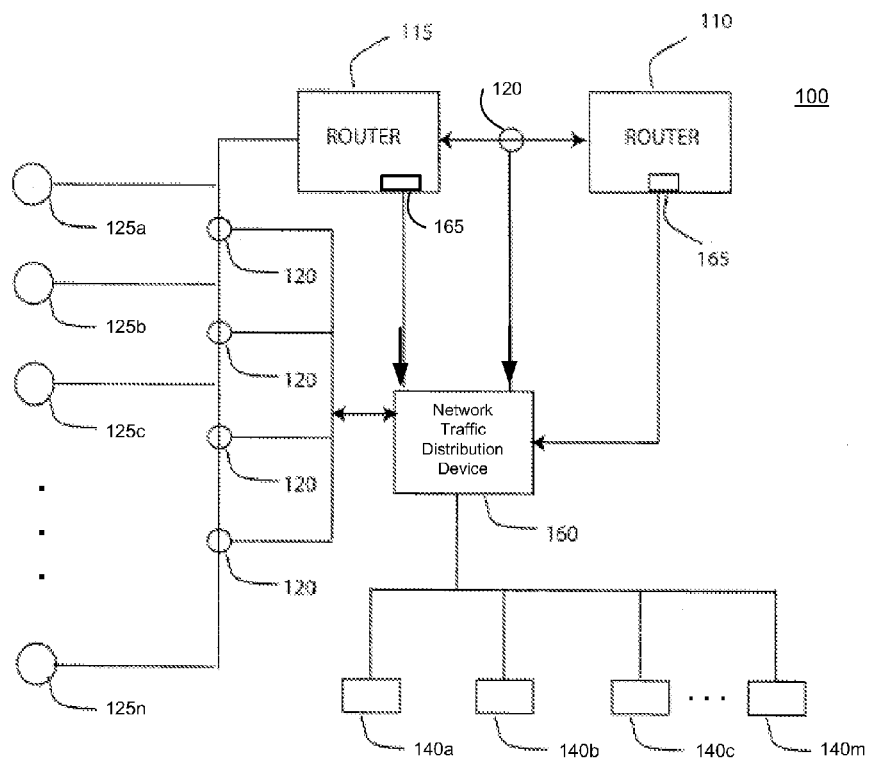
FIG. 1 is a block diagram depicting a data communications network consistent with an embodiment of the present invention.
FIG. 2 is a block diagram depicting a data packet consistent with an embodiment of the present invention.

Turning now to FIG. 1, an exemplary data communications network 100 is shown. System 100 includes router 110 and router 115. In a GPRS data communications network, router 110 may be a GPRS Support Node (GGSN) and router 115 may be a Serving GPRS Support Node (SGSN) router. Data packets may be communicated between router 110 and router 115, and either directly or indirectly to one or more users, 125a-125n. Data communication sessions initiated by and/or involving users 125a-125n may each be assigned a unique tunneling ID.

System 100 also includes a network traffic distribution device 160. Network traffic distribution device 160 may include a plurality of ingress ports and a plurality of egress ports and may be configured to capture network traffic data packets via inline traffic capture points, such as inline traffic capture point 120 on a communication link between routers 110 and 115. Network traffic distribution device may also be enabled to receive captured network traffic via a mirroring port 165, resident on router 110 and/or router 115. In addition, network traffic distribution device 160 is configured to analyze data packets which it receives to determine one or more tunneling ID(s) associated with each data packet.

As shown in the illustration, network traffic distribution device 160 may be communicatively coupled to one or more external devices 140a-140m. Examples of such external devices include network monitoring devices, monitors, network analyzing devices, packet analysis devices, network intrusion devices, and/or combinations thereof. Network traffic distribution device 160 may also distribute traffic flows of data packets across its plurality of egress points so that data packets with the same tunneling ID are distributed to the same egress port and, eventually, to the same external device. Although FIG. 1 illustrates multiple separate external devices coupled to a common egress port of the network traffic distribution device, this is not necessarily so and different external devices may be coupled to different egress ports of the network traffic distribution device.

In some embodiments, network traffic distribution device 160 may distribute captured network traffic to the external devices, such that data packets associated with a particular user ID are sent to the same monitoring device. For example, data packets with a tunneling ID associated with user 125a may be sent to monitoring device 140a; data packets with a tunneling ID associated with user 125b maybe sent to monitoring device 140b; and so on. It need not necessarily be the case that each flow of data packets with a common tunneling ID be sent to a unique external device and, in some cases, two or more traffic flows, each with packets having respective, common tunneling IDs may be provided to the same external device, either via a common egress port of the network traffic monitoring device or via separate egress ports thereof.

FIG. 2 depicts a data packet 200 that includes a tunneling ID 210, consistent with an embodiment of the present invention. Data packet 200 may also include a header 205, a payload 215, and a frame check sequence (FCS) and/or cyclic redundancy check (CRC) block 220.

Figure 3:
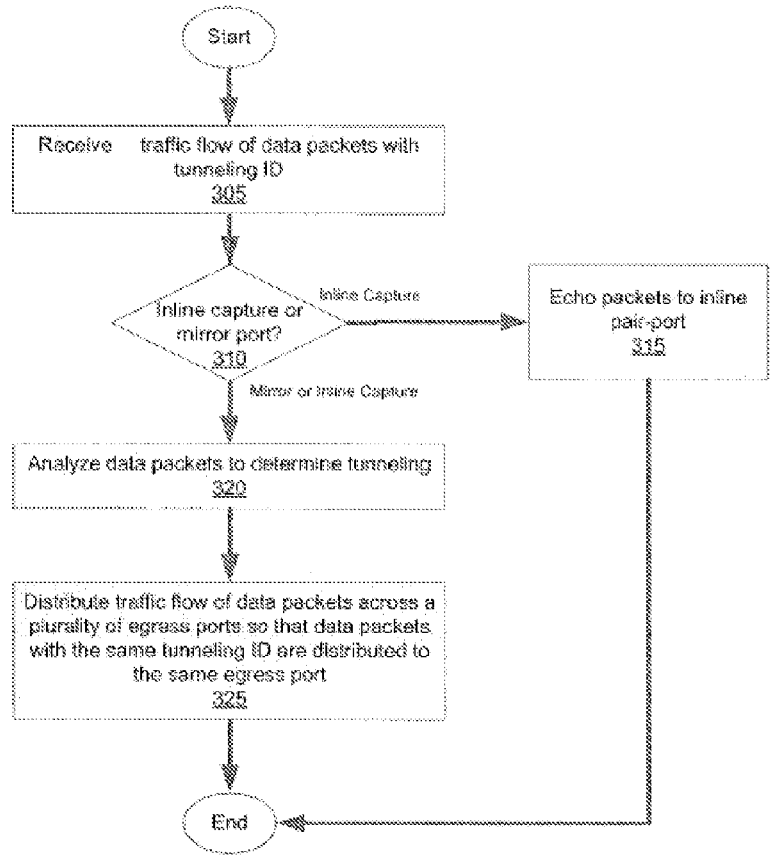
FIG. 3 is a flow chart depicting a process for distributing a flow of data including tunneling identifiers.

FIG. 3 is a flow chart depicting a process 300 for distributing a flow of captured network data packets across a plurality of egress ports included in a network traffic distribution device, consistent with an embodiment of the present invention. Process 300 may be performed by a node in a data communication system, such as data communication system 100, and/or a network traffic distribution device, such as network traffic distribution device 160.

At step 305, a flow of captured network data packets is received (e.g., at the network traffic distribution device). As indicated above, the data packets of the flow include a tunneling ID. At step 310, a determination of whether the traffic flow of captured data packets was received via an inline capture or a mirroring port is made. If the flow of data packets was received via inline capture, then the data packets may be echoed to an inline pair port (step 315). An inline pair-port may be an egress port resident in the network traffic distribution device.

When the captured network traffic data packets are received via an inline capture or a mirroring port, the data packets are analyzed to determine the tunneling ID included in each data packet (step 320). Based on this determination, at step 325, the flow of data packets are distributed across the plurality of egress ports of the network traffic distribution device so that data packets with the same tunneling ID are transmitted via the same egress port. In some cases, this will result in data packets being transmitted to one or more external devices.

Note that process 300 may be generalized so that different flows of data packets with different tunneling IDs are received at step 305 and the analysis at step 320 would then include determining which packets contained which tunneling IDs so that packets with the same tunneling IDs could be transmitted to a common egress port (which may or may not be the same egress port used for other packets with a different tunneling ID). Determining a tunneling ID of a packet involves parsing the tunneling ID field 210 of the packet and subsequent direction of a packet with a particular tunneling ID to a particular egress port may involve consulting a lookup table or similar data structure stored in memory in order to determine the appropriate egress port to send the subject packet to. Such a table or other data structure would map the tunneling IDs of packets to egress ports and the table may be provided to the network traffic distribution device as part of an overall configuration of the device or separately. Such tables may also be constructed on-the-fly as other information concerning which tunneling IDs to map to which egress ports is received at the network traffic distribution device from the captured traffic itself.

Figure 4:
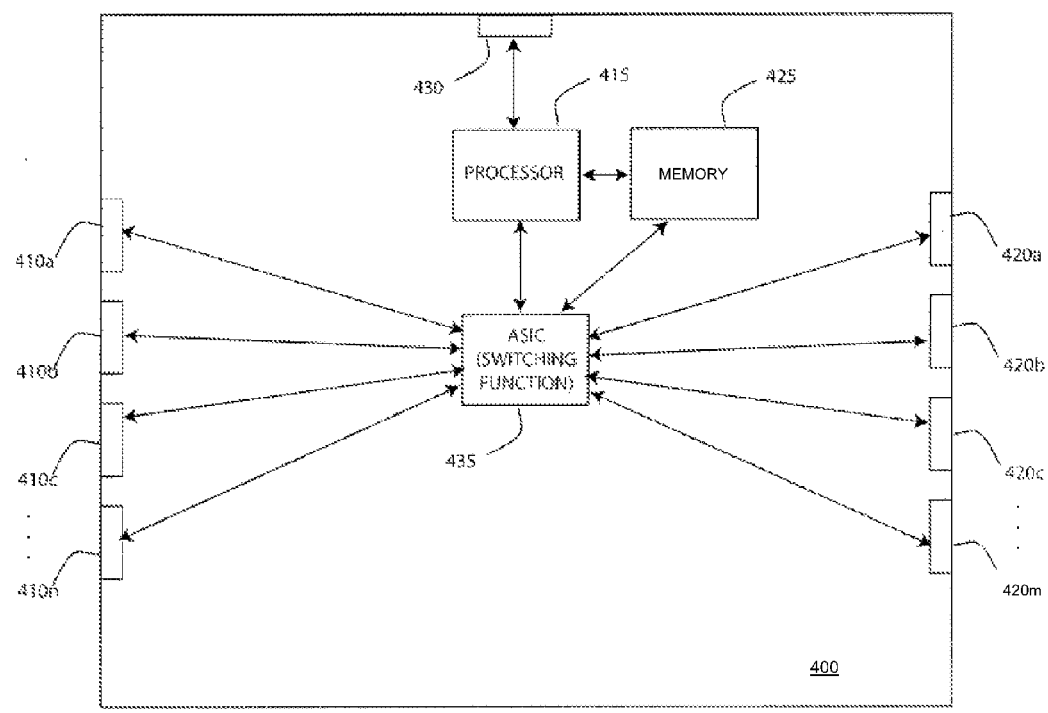
FIG. 4 is a schematic diagram depicting a network traffic distribution device consistent with an embodiment of the present invention.

FIG. 4 is a block diagram illustrating an example of a network traffic distribution device 400 configured in accordance with an embodiment of the present invention. Network traffic distribution device 400 includes a plurality of ingress ports 410a-410n and egress ports 420a-420m. One or more of the egress ports may be configured as a monitoring port. Data packets may be received by network traffic distribution device 400 via one or more of the ingress ports, for example, from a mirror port of a source of the data packets and/or from an inline traffic capture point in a communication link within a network being monitored.

Data packets received at an ingress port of the network traffic distribution device may be forwarded to a processor 415 for analysis under the control of an application specific integrated circuit (ASIC) 345. ASIC 345 may thus implement a switching function. Processor 415 may be any appropriate processing device and may process the received data packets according to one or more instructions resident in a memory 425. Memory 425 may be any appropriate data storage device, for example a ROM, EPROM, EEPROM, RAM, flash memory, or other form of storage device. The processing functions preformed by processor 415 may include analyzing the data packets to determine tunneling IDs associated therewith and determining appropriate egress ports of the network traffic distribution device to transmit those packets from, such that data packets with the same tunneling ID are distributed to the same egress port. Processor 415 may be managed (e.g., configured) by way of a management port 430 (which may, for example, be used to load instructions and/or tables to be stored in memory 425 and/or processor 415). Once processor 415 processes a data packet, that data packet may be returned by the processor to ASIC 435. ASIC 435 may then transmit the processed data packet to one more egress ports 420a-420m for eventual transition to a device external to network traffic distribution device 400.

Processor 415 may also be completely self-contained, for example if implemented as a field programmable gate array, and not require the use of external memory 425. The processor, which can natively decode the tunneling protocol of the input packets, may direct packets from specific tunnels to specific egress ports by adding additional information to the packet, such as appending an 802.1Q virtual local area network (VLAN) tag. Such tags may then be used by the switching ASIC 435 to direct the packets to their destination (or egress) port. Further, the switching ASIC may remove any such applied tags, thus returning the packet to its original form.

Thus, methods, systems and apparatus for distributing captured data packets that include tunneling IDs have been presented. In the preceding discussion various embodiments of the present invention were described as being implemented with the aid of computer-implemented processes or methods (a.k.a. programs or routines). Such programs may be rendered in any computer-readable language and, in general, are meant to encompass any series of logical steps performed in a sequence to accomplish the stated purpose. Any part of the foregoing description that was presented in terms of algorithms and/or symbolic representations of operations on data within a computer memory should be understood as steps requiring physical manipulations of physical quantities (usually represented in the form of electrical or magnetic signals) within computer-readable storage devices. Accordingly, throughout the preceding description of the present invention, terms such as "processing", "computing", "calculating", "determining", "displaying" or the like, should be understood as referring to the actions and processes of an appropriately programmed computer processor, or similar electronic device, that manipulates and transforms data represented as physical (electronic) quantities within the computer processor's registers and any associated memories or other storage devices into other data similarly represented as physical quantities within those memories or registers or other such information storage devices. The programs comprise computer-executable instructions stored on one or more such computer-readable storage mediums accessible to the computer processor, for example any type of disk including hard disks, floppy disks, optical disks, compact disk read only memories (CD-ROMs), and magnetic-optical disks, ROMs, RAMs, EPROMs, EEPROMs, flash memories, or other forms of storage media accessible to the computer processor.

What is claimed is:

1. A method, comprising:
   receiving, by a network traffic distribution device that includes a plurality of ingress and egress ports, captured data packets, the captured data packets being at least one of a copy and a representation of data packets flowing through a communication network, wherein the captured data packets are received via at least one of a mirror port resident on a source of the captured data packets and a traffic capture point located along a communication link between two communicating devices;
   determining a tunneling identifier (ID) associated with each captured data packet;
   distributing the captured data packets across the plurality of egress ports such that captured data packets with a common tunneling ID are distributed to a common one of the egress ports and successively received captured data packets with the same tunneling ID are distributed to the common egress port; and
   transmitting the captured data packets from the network data distribution device via the egress ports.

2. The method of claim 1, wherein the tunneling ID is a general packet radio service (GPRS) tunneling protocol (GTP) tunneling ID.

3. The method of claim 1, wherein the captured data packets include telecommunications data packets.

4. The method of claim 1, wherein the captured data packets are in flows and different flows of captured data packets are received at different ones of the ingress ports of the network traffic distribution device.

5. The method of claim 4, wherein the captured data packets are received at the network traffic distribution device from different sources.

6. The method of claim 4, wherein captured data packets of each respective flow have different tunneling IDs and are associated with different users of a communications system that includes the network traffic distribution device.

7. The method of claim 4, wherein the captured data packets of each of the flows have different respective tunneling IDs across different flows and distributing the captured data packets across the plurality of egress ports comprises associating the respective tunneling IDs with respective ones of the egress ports according to information stored by the network traffic distribution device.

8. A system, comprising:
   a plurality of network communication nodes for transmitting one or more flows of captured data packets through a communication network that includes the network communication nodes, wherein the captured data packets each include a respective tunneling identifier (ID); and
   a network traffic distribution device communicatively coupled to at least one of a traffic capture point located on a communication link communicatively coupling two of the network communication nodes, and a mirroring port resident on one of the network communication nodes, the network traffic distribution device configured to distribute captured data packets received via either or both of the traffic capture point and the mirroring port across egress ports of the network traffic distribution device such that captured data packets having common tunneling IDs are distributed to a same one of the egress ports of the network traffic distribution device, wherein the captured data packets are at least one of a copy and a representation of the captured data packets flowing through the communication network.

9. The system of claim 8, wherein the network traffic distribution device is configured to distribute the captured data packets of each of the flows by associating respective tunneling IDs of the captured data packets with respective ones of the egress ports according to information stored by the network traffic distribution device.

10. The system of claim 8, wherein the network traffic distribution device includes a plurality of ingress ports communicatively coupled to different sources of captured data packets within the communication network such that the flows of captured data packets are received at different ones of the ingress ports of the network traffic distribution device.

11. The system of claim 8, wherein the egress ports of the network traffic distribution device are coupled to a plurality of external devices for receiving the captured data packets.

12. The system of claim 11, wherein different one of the external devices are coupled to a common one of the egress ports.

13. A network traffic distribution device comprising:
- a plurality of ingress ports for receiving captured data packets, the captured data packets being at least one of a copy and a representation of data packets flowing through a communication network, wherein the captured data packets are received via at least one of a mirror port resident on a source of the captured data packets and a traffic capture point located along a communication link between two communicating devices;
- a processor communicatively coupled to the plurality of ingress ports and to a plurality of egress ports of the network traffic distribution device; and
- a memory for storing one or more sets of instructions to be executed by the processor, wherein said instructions, when executed by the processor, cause the processor to analyze captured data packets received at the ingress ports, determine tunneling identifiers (IDs) included in the captured data packets, and distribute the captured data packets across the egress ports so that captured data packets with the same tunneling ID are distributed to the same egress port.

14. The network traffic distribution device of claim 13, further comprising means for switching communicatively coupling the processor to the ingress and egress ports.

* * * * *